March 31, 1964  T. E. BELSHAW  3,126,842
DOUGHNUT RING FORMING APPARATUS AND METHOD
Filed Aug. 10, 1961
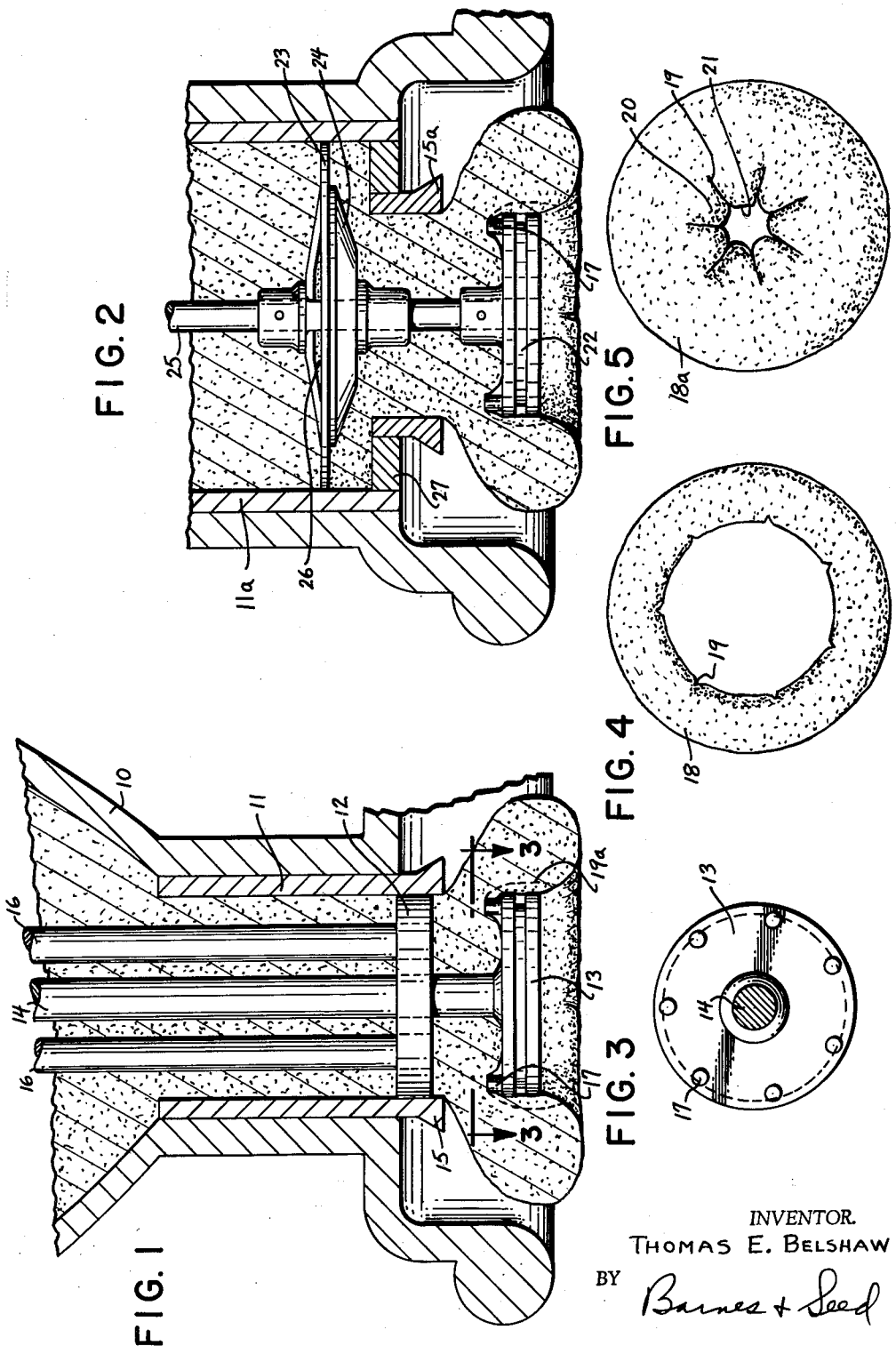
INVENTOR.
THOMAS E. BELSHAW
BY *Barnes + Seed*
ATTORNEYS

United States Patent Office

3,126,842
Patented Mar. 31, 1964

3,126,842
DOUGHNUT RING FORMING APPARATUS AND METHOD
Thomas E. Belshaw, 1772 22nd Ave. S., Seattle, Wash.
Filed Aug. 10, 1961, Ser. No. 130,576
1 Claim. (Cl. 107—14)

The present invention relates to improved apparatus and method for forming "cake" doughnuts, i.e. those in which the dough has an inorganic leavening agent such as baking powder.

In the forming of cake doughnuts it is preferred to have all "breaking" during the frying operation occur at the inside of the dough ring so that a product of substantially uniform size and shape can be obtained. Even when this result has been achieved such "breaking" has not been controlled and hence the hole of the finished doughnut has not had a predetermined shape, but rather has had irregularly shaped flutes or blooms in a random effect, and sometimes small irregular secondary holes are formed. Accordingly, the present invention aims to provide improved apparatus and method whereby the blooming and breaking of the dough at the center of a doughnut ring will be controlled and assured during frying so that the ring will not burst at the outside and so that uniform center openings will be achieved giving a more attractive end product.

With the foregoing and other still more particular objects and advantages in view and which will appear and be understood in the course of the following description and claim, the invention consists in the novel construction and in the adaptation and combination of parts hereinafter described and claimed.

In the accompanying drawings:

FIGURE 1 is a side elevational view, with parts of the hopper in vertical section, of the present invention applied to a first embodiment of a dough forming and dispensing apparatus.

FIG. 2 is a view similar to FIG. 1 of the invention applied to a second embodiment of such apparatus.

FIG. 3 is a horizontal sectional view showing the upper face of the mandrel (line 3—3 of FIG. 1).

FIG. 4 is a plan view of a dough ring before the frying step.

FIG. 5 is a plan view of a finished doughnut.

Referring to the drawings, for purpose of example I have illustrated my invention applied to two different types of dough forming devices and namely those shown in United States Patents Nos. 1,738,033 and 2,637,282. In the first of these, shown in FIG. 1, the dough is fed from a hopper 10 into a depending cylinder 11 from which it is discharged by action of a plunger 12 which coacts with a forming piston or mandrel 13. The latter is carried by a rod 14 which is reciprocated to move the mandrel to a forming position spaced beneath the lower rim 15 of the cylinder 11 and then the plunger 12 rides along the rod 14 by action of a pair of reciprocating rods 16 to extrude dough from the cylinder between its rim 15 and the mandrel 13. On the return stroke of the rod 14 and rods 16 the mandrel coacts with the rim 15 to cut off the extruded dough ring.

Instead of having a flat uninterrupted upper face as in Patent 1,738,033, the mandrel 13 of the present invention is provided with a plurality of equally spaced upstanding protrusions which may take the form of circular posts 17 arranged circumferentially adjacent the periphery thereof. These posts have a height which is preferably decidedly less than the distance from the mandrel to the rim 15 of the cylinder 11 when the mandrel is at its lowermost position. A post heighth of about one-fourth such distance gives excellent results.

During the extrusion operation of the device, the dough flows over the posts 17 and these not only restrict passage of the dough but rupture the gas pockets in the dough formed therein by the leavening action. As a result evenly spaced "dead" spots occur which are located at the inside of the dough ring after it is cut off. Such a dough ring, denoted 18, is illustrated in FIG. 4 in which the dead spots are designated 19, and it will be noted that they become radial scores or grooves extending the height of the ring. In FIG. 1 the dough extrusion is illustrated with the dotted line 19a showing generally the inner end of one of the dead spots 19. After the ring 18 is cut off the portion thereof which contacted the posts 17 and upper face of the mandrel drops relative to the hanging portion of the ring and becomes the center portion thereof.

During the subsequent frying operation, the dough of the ring 18 begins to expand inwardly with the expansion being concentrated at those portions containing the unruptured gas pockets, i.e. the portions 20 between the dead spots 19. As these portions 20 expand toward the center of the ring the resulting flutes or blooms finally burst at 21 giving the desired "breaking." The blooming then continues until frying is completed. As a result, and as illustrated in FIG. 5, the hole of the finished doughnut 18a is given a star-like shape with the points at the dead spots caused by the posts 17.

In FIG. 2 I have illustrated the posts 17 on the mandrel 22 of dough forming apparatus such as that in Patent 2,637,282, the check valve components being designated 23—24, and the reciprocating rod by 25. Component 23 and the mandrel 22 are fixed to the rod 25 while the other component 24 is slidably therebetween to close the valve openings 26 in the component 23 during the downstroke. After this closure the components 23—24 function as a plunger to extrude dough from a modified cylinder 11a between the formnig piston and the rim 15a of a reduced outlet provided by a plug 27 as the downstroke is completed. During this extrusion (FIG. 2) the posts 17 operated in the same manner as before described. The mandrel 22 then coacts with the rim 15 to cut off the dough ring during the upstroke of the rod 25 and the check valve 23—24 opens to replenish the cylinder 11a from the hopper.

It is believed that the invention will have been clearly understood from the foregoing description of my now preferred illustrated embodiments. Changes in the details of construction may be resorted to without departing from the spirit of the invention, wherefore it is my intention that no limitations be implied and that the hereto annexed claim be given a scope fully commensurate with the broadest interpretation to which the employed language fairly admits.

What I claim is:

In combination, a dough hopper with a bottom outlet, a mandrel having a center rod extension at the top operatively associated with said hopper for up and down movement between a dough forming position wherein the mandrel cooperates with the rim of said outlet, said mandrel having a flat annular upper face opposing said outlet and regularly spaced rounded posts projecting upwardly from said face adjacent the periphery thereof in parallel relation to said rod, each of said posts projecting upwardly throughout the entire circumference of its base but only projecting upwardly a minor part of the distance from said upper face to said outlet when the mandrel is in dough forming position, and means operatively associated with said hopper for extruding dough from said outlet over said face and posts and around said mandrel while the mandrel is in dough forming position.

(References on following page)

References Cited in the file of this patent

UNITED STATES PATENTS

| | | |
|---|---|---|
| 1,621,454 | Bleier | Mar. 15, 1927 |
| 2,126,416 | Schlichter | Aug. 9, 1938 |
| 2,635,560 | Coyne | Apr. 21, 1953 |
| 2,676,552 | Hunter et al. | Apr. 27, 1954 |
| 2,828,700 | Belshaw | Apr. 1, 1958 |
| 2,962,810 | Gilmore | Dec. 6, 1960 |
| 2,985,119 | Gilmore | May 23, 1961 |
| 3,003,439 | Belshaw | Oct. 10, 1961 |